May 24, 1960 E. H. ORENICK ET AL 2,937,834
CABLE FASTENER
Filed Feb. 9, 1959
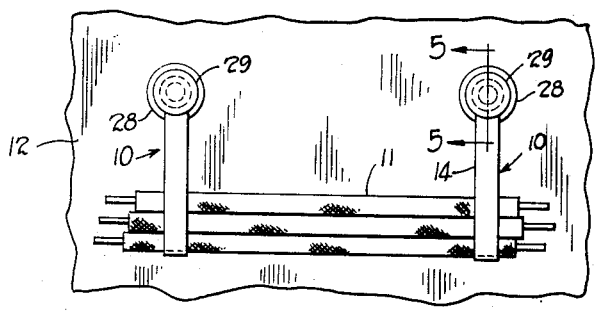
Fig. 1
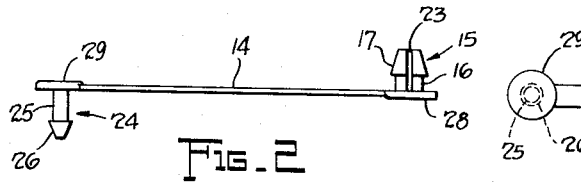
Fig. 2
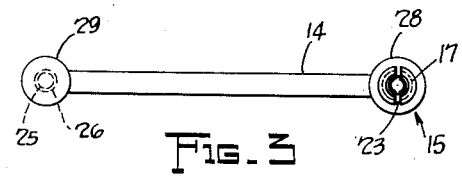
Fig. 3
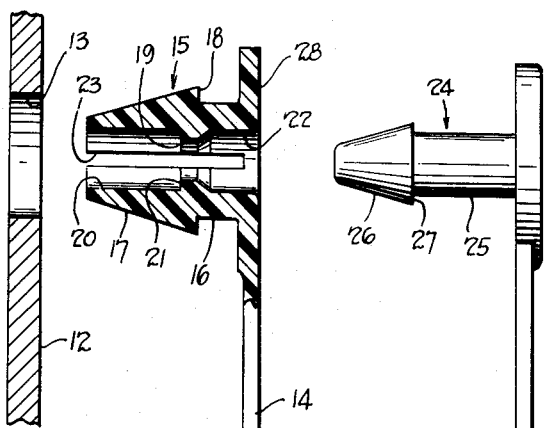
Fig. 4
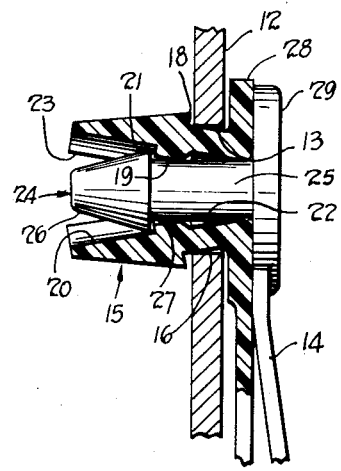
Fig. 5
INVENTOR.
EMIL H. ORENICK and
BY MICHAEL W. ORENICK
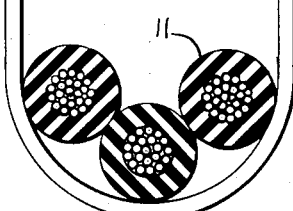
ATTORNEY.

United States Patent Office 2,937,834
Patented May 24, 1960

2,937,834
CABLE FASTENER

Emil H. Orenick, 9011 W. Moreland Road, Parma, Ohio, and Michael W. Orenick, 1224 Irene Road, Lyndhurst, Ohio Filed Feb. 9, 1959, Ser. No. 792,130

1 Claim. (Cl. 248—71)

This invention relates to fasteners and particularly to fasteners for holding electric cables suspended in a loop anchored in a wall hole.

Conducive to a better understanding of this invention it may be well to point out that the modern automobile has many electrical gadgets, lights, and power operated devices such as windows, seats, windshield wipers, air-conditioners and the like that are controlled from a central point such as the dashboard. This of course requires that many electric cables be brought to the central point. In order to do this in an orderly manner such circuits are usually grouped together into bundles which are anchored at spaced intervals on the panel walls of the body. In the past many different types of anchoring devices have been used such as metallic clips which are riveted to the panel walls; or straps of various kinds that are looped around the cables and seated in holes in the panel walls. Many of such fasteners require special tools for their attachment, or do not form a permanent anchorage so that after a time they become loosened under the severe vibration normally present in motor vehicles. Furthermore if metallic clips are used, the constant vibration acts to cause the clip edges to eventually cut through the cable insulation.

The primary object of this invention, therefore, is to provide a fastener for supporting electrical cables that can be permanently anchored through a hole in a panel wall.

Another object is to provide a device of the type stated that can be looped around the cables and permanently anchored in such a wall hole, without the use of any tool.

Still another object is to provide such a fastener that cannot be re-opened without destroying the fastener.

A further object is to provide a simple one-piece fastener that can be easily flexed upon itself to provide a cable supporting loop having both anchoring and locking elements that can be interfitted through a wall hole for attachment thereto, but which cannot be withdrawn from said hole, once fitted therein.

These and other objects of the invention will become apparent from a reading of the following specification and claim, together with the accompanying drawing wherein:

Figure 1 is a front elevation of a portion of a panel wall showing two of the fasteners which are the subject of this invention mounted thereon and supporting a section of electric cables therebetween;

Figure 2 is a side elevation of one of the electric cable fasteners that is the subject of this invention;

Figure 3 is a top plan view of the same;

Figure 4 is a side elevation, partly in section of the supported cable and fastener as it appears positioned in front of a panel wall immediately prior to its insertion through the mounting hole; and Figure 5 is an enlarged sectional view of the anchored fastener taken along the line and in the direction of the arrows 5—5 of Figure 1.

Referring more particularly to the drawing, there is seen in Figure 1 two of the fasteners which are the subject of this invention, broadly indicated by reference numeral 10 mounted on the panel wall 12 and supporting three electric cables 11 therebetween.

The fastener 10 comprises a substantially flat flexible strap 14 having an anchor element, broadly indicated by reference numeral 15 mounted at one end 28 thereof and a lock element, broadly indicated by reference numeral 24 mounted at the end 29 thereof. Both of these elements are formed integral with the strap 14. Each element 15 and 24 extends laterally of the strap surfaces on opposite sides thereof as seen in Figures 2 and 3.

The anchor element 15 and the lock element 24 are adapted to be brought into apposition by flexing the strap 14 upon itself, as seen in Figure 4.

The fastener 10 may be made of any material having the required physical characteristics of flexibility, dimensional and heat stability, freedom from sharp edges that might abrade the cables 11 and high dielectrical strength.

A preferred material that meets all these qualifications is a plastic commonly known by the trade-marked name "nylon." This plastic is tough, wear resistant and stable under temperatures up to 300° F. which is most desirable for use around automobile engines, where elevated temperatures are common.

The fastener 10 is cast in one piece with the strap length 14 determined by the size of the loop required to support the number of cables to be contained therein.

The anchor element 15 comprises a conical head 17 mounted on a cylindrical stem 16. The diameter of the base 18 of the conical head 17 is greater than the diameter of the panel wall hole 13, which in the structure illustrated is ¼" in diameter. The diameter of the stem 16 is less than that of the hole 13, so that the stem may snugly fit through the hole 13.

The head 17 and stem 16 have an axial bore 19 therethrough normal to the long axis of the strap 14 and extending through the end 28 of the strap as is seen most clearly in Figure 4.

The head 17 has a counter-bore 20 defining an abutment 21 positioned proximate the base end thereof. The stem 16 is also counter-bored at 22.

Reference numeral 23 indicates a diametrical slot which divides the head 17 and stem 16 into two identical halves which are free to flex toward or away from each other on the strap end 28.

The lock element 24 comprises a solid conical head 26 mounted on a cylindrical stem 25; the diameter of the base 27 of the head 26 being greater than that of both the anchor element bore 19 and counter-bore 20; the diameter of the stem 25 being less than that of said bores.

The procedure in mounting the fastener 10 to support the cables 11 is as follows:

The anchor element 15 is positioned in part of the panel wall hole 13, as seen in Figure 4. The small end of the conical head 17 is inserted in the hole 13 and pushed therethru. Due to the fact that the base 18 is of larger diameter than the hole 13 the two halves of the head on either side of the slot 23 will flex toward each other until the diameter of base is reduced enough to pass through the hole 13. As soon as the head 17 reaches the back side of the wall 12 the two halves of the head 17 will expand to their normal positions wherein the base 18 will seat against the back side of the wall, with the stem 16 fitted through the hole 13 and the end 28 of the strap positioned against the front side of the wall 12. Thus the expanded base 18 of the head 17 will hold the anchor element 15 in the hole 13.

The strap 14 is then flexed upon itself and looped around the cables 11 until the lock element 24 is brought into apposition to the anchor element 15 as seen in Figure 4. The lock head 26 is then inserted in the stem counter-bore 22 and pushed through the bore 19 into the counter-bore 20 of the anchor head 17 with its base 27 engaged with the abutment 21 thereof as seen in Figure 5. Due to the fact that the diameter of the base 27 is larger than that of the counter-bore 20 of the anchor head 17, the lock head 26 will cause the two halves of the anchor head 17 to be locked in a permanently expanded position. It will be evident from an examination of Figure 5 that as long as the head 26 is nested within the head 17, the head 17 can never be compressed enough to permit its base end 18 to pass through the hole 13. Thus the supporting loop for the cable 11 is permanently anchored in place in the hole 13. The fastener 10 can never be removed from the hole 13, except by destroying it by cutting through the two stems 16 and 25.

The anchored fastener presents a pleasing and neat appearance, since all that is visible from the front side of the wall 12 is the strap 14 and its circular end positions 28 and 29 as seen in Figure 1.

While the fastener has been described as being used with electrical cables it could be used to support anything that could be held in place by suspension from a looped strap.

It will now be clear that there has been provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

In combination with a panel wall having a hole therethrough, an electric cable fastener, comprising, a substantially flat flexible strap having anchor and lock elements, formed integral therewith, positioned at opposite ends and sides thereof and adapted to be brought into apposition by flexing the strap upon itself, the anchor element comprising a conical head mounted on a cylindrical stem, the diameter of the base of the head being greater than that of the panel wall hole, the diameter of the stem being less than that of said hole, the head and stem having an axial bore therethrough normal to and through the long axis of the strap, the head having a counter-bore therein defining an abutment positioned proximate the base thereof, the head and stem also having a diametric slot dividing them into two identical halves free to flex on the strap, toward or away from each other, the lock element comprising a solid conical head mounted on a cylindrical stem, the diameter of the base of the head being greater than that of the anchor element bore and counterbore, the stem being of smaller diameter than said bores, the anchor stem being positioned through the panel wall hole with the base of its conical head positioned against the opposite side of the wall, the conical lock head being nested within the anchor head counterbore against the abutment thereof, whereby the halves of the anchor head are flexed away from each other to permanently lock both interfitted elements against removal through the panel wall hole and with the flexed strap forming a cable supporting loop.

References Cited in the file of this patent

UNITED STATES PATENTS

| 2,548,104 | Frison | Apr. 10, 1951 |
| 2,759,390 | Edwards | Aug. 21, 1956 |

FOREIGN PATENTS

| 1,111,742 | France | Nov. 2, 1955 |